United States Patent [19]
Bigolin

[11] Patent Number: 5,294,174
[45] Date of Patent: Mar. 15, 1994

[54] SAFETY SADDLE FOR BICYCLES, MOTORCYCLES OR THE LIKE

[76] Inventor: Giuseppe Bigolin, Via Salute 50 Rossano, Veneto, Italy

[21] Appl. No.: 987,667

[22] Filed: Dec. 9, 1992

[30] Foreign Application Priority Data

Dec. 13, 1991 [IT] Italy .................. MI91 U 001099

[51] Int. Cl.⁵ .................................. B62J 1/02
[52] U.S. Cl. ...................... 297/212; 297/209
[58] Field of Search ............ 297/201, 208–212, 297/312

[56] References Cited

U.S. PATENT DOCUMENTS

| | | | |
|---|---|---|---|
| 554,337 | 2/1896 | Dodds et al. | 297/212 |
| 2,279,817 | 4/1942 | Faulhaber | 297/212 |
| 2,300,379 | 10/1942 | Faulhaber | 297/212 |

FOREIGN PATENT DOCUMENTS 529160 11/1940 United Kingdom ............ 297/212

Primary Examiner—Michael F. Trettel
Attorney, Agent, or Firm—Bucknam and Archer

[57] ABSTRACT

Safety saddle, for bicyles, and motorcyles, comprising a saddle frame, which can be applied to a bicycle or the motorcycle, and supports a framework defining the seat portion of the saddle. Between the framework and frame there are arranged two coil springs, resiliently urging the framework and the frame so as to prevent them from moving toward one another, the saddle further comprising a covering element, arranged between the frame and framework, and covering the coil springs so as to prevent injuries to the user because of possible contacts with the springs.

1 Claim, 2 Drawing Sheets

SAFETY SADDLE FOR BICYCLES, MOTORCYCLES OR THE LIKE

BACKGROUND OF THE INVENTION

The present invention relates to a safety saddle for bicycles, motorcycles or the like.

As is known, saddles for bicycles and for some types of motorcycles comprise a rigid frame, which can be anchored to the bicycle, and a framework, which is articulated on the top of the frame and is suitably coated by a padding or other suitable material in order to provide the seat part of the saddle.

Near the rear part of the framework there are conventionally provided two coil springs, arranged between the frame and framework, so as to provide a damping function for a comfortable sitting by the user in particular as the bicycle or motorcycle is run on uneven roads.

The provision of these springs, on the rear part of the saddle, however, can cause drawbacks, particularly in the case in which a child is carried on a small seat provided at the rear of the saddle.

In fact, the child could contact by his/her hands the springs, or introduce the fingers between the coils of the springs, with the consequence of possible injuries due to the compression of the springs.

SUMMARY OF THE INVENTION

Accordingly, the aim of the present invention is to overcome the above mentioned drawback, by providing a safety saddle construction, preventing accidental injuries due to a contact with the saddle springs from occuring.

Within the scope of the above mentioned aim, a main object is to provide a safety saddle adapted to prevent an user from accessing the rear saddle springs.

A further object of the present invention is to provide such a safety saddle which is very agreeable for a mere aesthetic standpoint, can be made very simply and, moreover, is very unexpensive.

According to one aspect of the present invention, the above mentioned aim and objects, as well as yet other objects, which will become more apparent hereinafter, are achieved by a safety saddle comprising a frame for application to a bicycle or the like, and supporting a framework forming a sitting portion of said saddle, as well as two coil springs arranged between said framework and frame, in order to prevent said framework and frame from moving towards one another, characterized in that said saddle further comprises a covering element arranged between said frame and framework and covering said coil springs.

BRIEF DESCRIPTION OF THE DRAWINGS

Further characteristics and advantages of the safety saddle according to the present invention will become more apparent hereinafter from the following detailed disclosure of a preferred, though not exclusive, embodiment thereof, which is illustrated, by way of an indicative, but not limitative example, in the accompanying drawing, where.

DESCRIPTION OF THE PREFERRED EMBODIMENT

With reference to figures of the accompanying drawings, the saddle according to the invention, which has been indicated generally at the reference number 1, comprises a frame 2 including, in a known manner, anchoring means for anchoring or affixing the saddle to a bicycle, or motorcycle, which anchoring means have been generally indicated at the reference number 3.

As shown, the frame 2 supports a framework 4, which forms the seat or sitting part proper of the saddle and is suitably coated by a padding or other suitable material, according to requirements.

Figure 3:
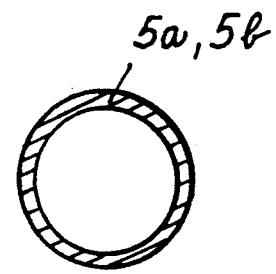
FIG. 3 is an enlarged cross-sectional view of FIG. 2, taken along the section line III—III.
Figure 5:
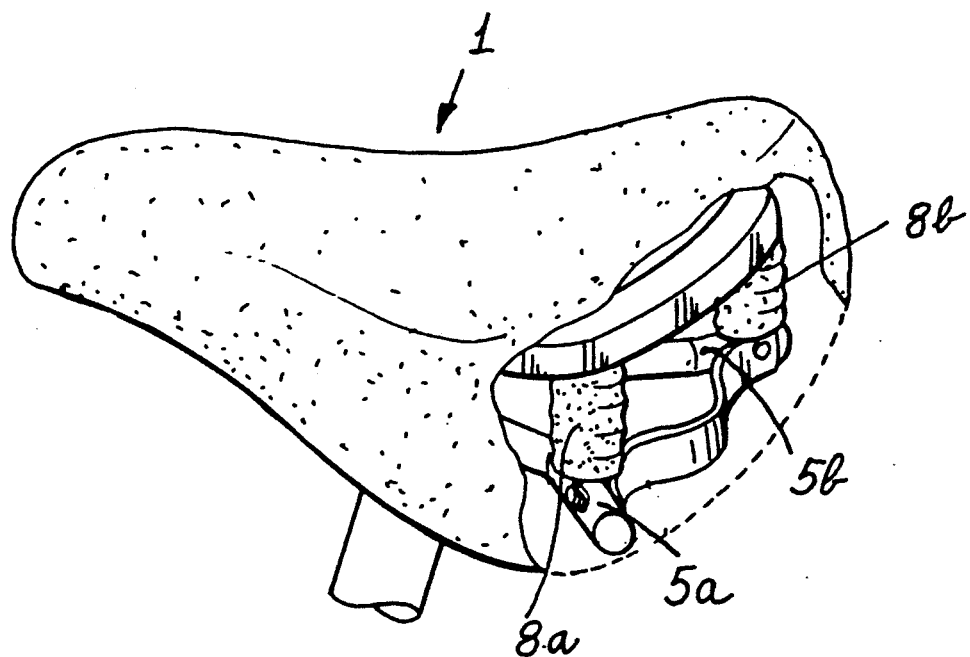
FIG. 5 is a partially broken away perspective view showing the subject safety saddle.

More specifically, the frame 2 is preferably formed by two elements 5a and 5b, of tubular construction, as is clearly shown in FIG. 3, which extend to the rear part of the saddle.

The framework 4 is articulated, near its front end portion, on the front end portion of the elements 5a, 5b, which form the mentioned frame 2, about a horizontal axis 6.

The rear end portion of the framework 4 bears on a pair of coil springs 7a, 7b, which are arranged between the framework 4 and frame 2.

The coil springs 7a and 7b are covered by a covering element 8a, 8b which is arranged between the framework 4 and frame 2.

Figure 1:
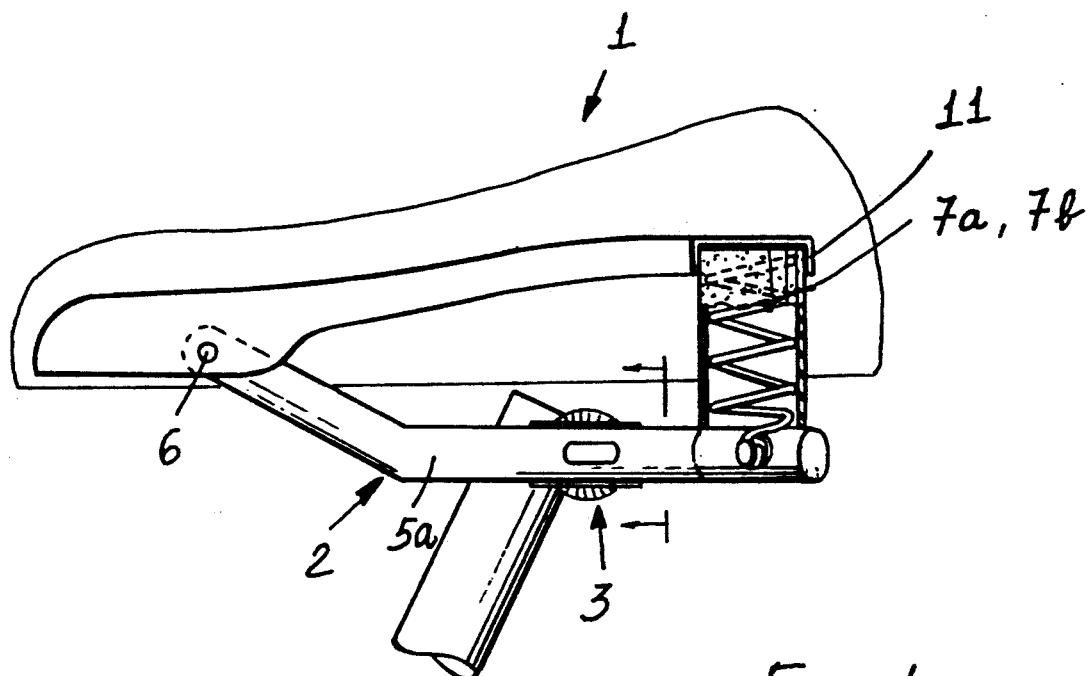
FIG. 1 is a schematic side elevation view, partially cross-sectioned, of the safety saddle construction according to the present invention.

As shown in FIG. 1, the covering element 8a, 8b can comprise a bellows element, made of a resiliently deformable material, such as a rubber material, which houses the related coil spring.

Figure 2:
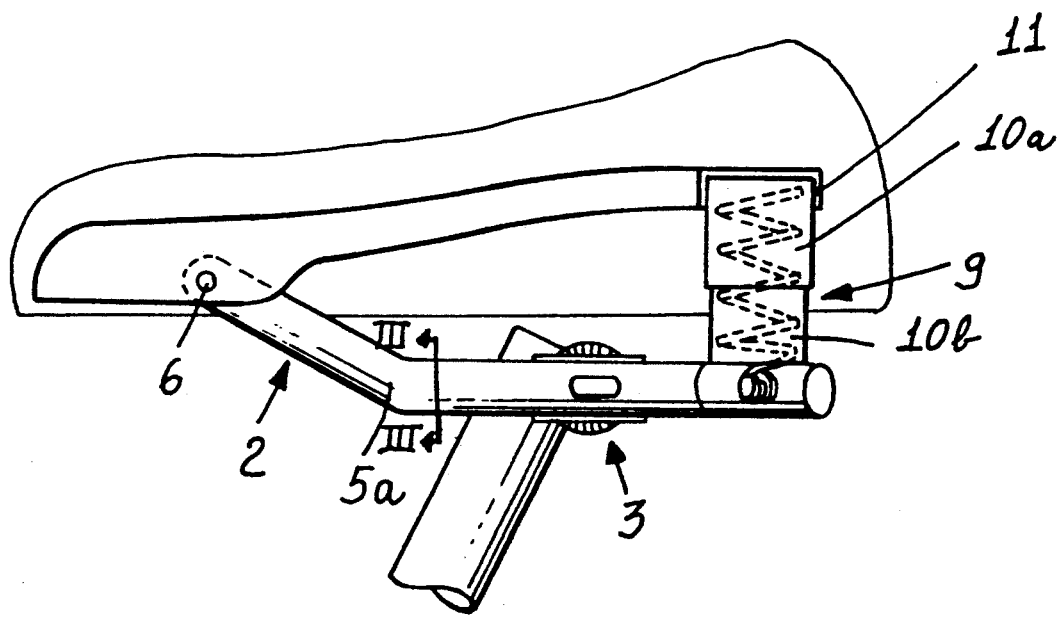
FIG. 2 is a side elevation view of the subject safety saddle, in which there is clearly shown a covering element for covering the coil springs of the saddle.
Figure 4:
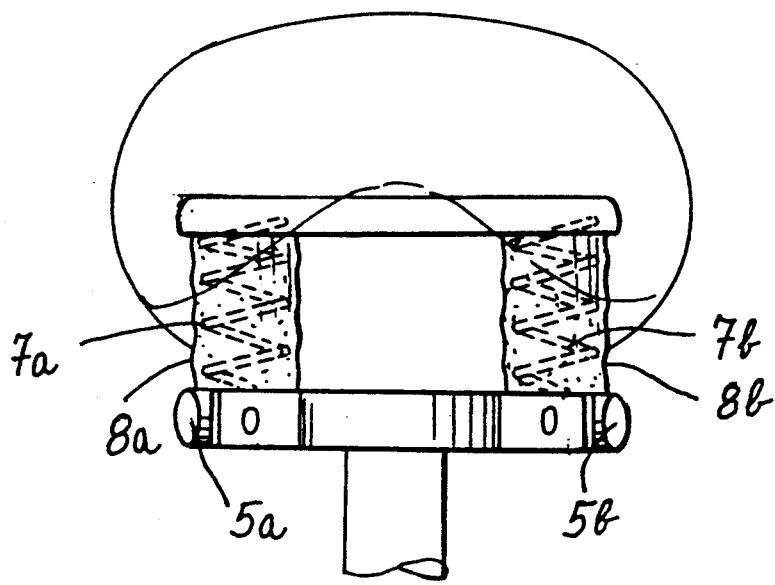
FIG. 4 is a rear elevation view of the safety saddle construction according to the present invention.

According to a modified embodiment, as shown in FIG. 2, the covering element, which in this case has been indicated at the reference number 9, can also comprise two hollow cylindric bodies, respectively indicated at 10a and 10b, of different diameters, so as to provide a telescopic type of covering.

In fact, the two mentioned hollow cylindric bodies can slide axially, one within the other, and they coaxially house the related coil spring.

The bottom end portions of the coil springs 7a and 7b are connected to the frame 2 in any known manners, whereas the top end portions of the springs and related covering element are housed in a suitable seat 11 formed in the framework 4.

Thus, since the covering element 8a, 8b, 9 fully covers the springs 7a and 7b, it will prevent any contacts against the springs, and, accordingly, will prevent in a very safe manner any possible injuries from occurring.

Moreover, the covering element in its telescopic embodiment, also operates to limit cross displacements of the framework 4 with respect to the frame 2, thereby providing the saddle with a great stability since the saddle will also exploit in an optimum way, that is with a nearly exclusively vertical movement, the damping effect of the coil springs 7a and 7b.

The covering element, moreover, provides the saddle with an aesthetically agreeable pattern.

From the above disclosure and the observation of the figures of the accompanying drawings, will be self evident the great safety and use facility characterizing the saddle construction according to the present invention.

In practicing the invention, the used materials, provided that they are compatible with the intended use, as well as the continget size and shapes, can be any, according to requirements.

I claim:

1. A safety saddle comprising a frame for application to a bicycle or the like, and supporting a framework forming a sitting portion of said saddle, as well as two coil springs arranged between said framework and frame, in order to prevent said framework and frame from moving towards one another, said saddle further comprising a covering element arranged between said frame and framework and covering said coil springs, said covering element comprising two hollow cylindrical bodies which can axially telescopically slide one within the other and coaxially house a respective said coil spring.

* * * * *